United States Patent
Patel et al.

(10) Patent No.: US 10,858,033 B2
(45) Date of Patent: Dec. 8, 2020

(54) DRIVER INTERVENTION DETECTION DURING STEERING COLUMN ASSEMBLY POWER STOWING AND UNSTOWING

(71) Applicant: STEERING SOLUTIONS IP HOLDING CORPORATION, Saginaw, MI (US)

(72) Inventors: Keyur R. Patel, Saginaw, MI (US); Edward A. Cana, Grand Blanc, MI (US)

(73) Assignee: Steering Solutions IP Holding Corporation, Saginaw, MI (US)

(*) Notice: Subject to any disclaimer, the term of this patent is extended or adjusted under 35 U.S.C. 154(b) by 140 days.

(21) Appl. No.: 16/116,397

(22) Filed: Aug. 29, 2018

(65) Prior Publication Data
US 2020/0070868 A1    Mar. 5, 2020

(51) Int. Cl.
*B62D 1/183* (2006.01)
*B62D 1/28* (2006.01)
*B62D 1/181* (2006.01)
*B62D 15/02* (2006.01)

(52) U.S. Cl.
CPC .............. *B62D 1/183* (2013.01); *B62D 1/181* (2013.01); *B62D 1/286* (2013.01); *B62D 15/025* (2013.01)

(58) Field of Classification Search
CPC ................................. B62D 1/183; B62D 1/286
See application file for complete search history.

(56) References Cited

U.S. PATENT DOCUMENTS

| | | | |
|---|---|---|---|
| 5,419,215 A | 5/1995 | Herron et al. | |
| 7,894,951 B2* | 2/2011 | Norris | H04L 67/12 180/443 |
| 9,720,411 B2* | 8/2017 | Crombez | B60W 50/08 |
| 2012/0046817 A1* | 2/2012 | Kindo | G05D 1/0061 701/23 |
| 2014/0303827 A1* | 10/2014 | Dolgov | B60W 50/10 701/23 |
| 2015/0239488 A1* | 8/2015 | Caverly | B62D 1/16 701/49 |
| 2016/0200344 A1 | 7/2016 | Sugioka et al. | |
| 2016/0244070 A1* | 8/2016 | Bendewald | B62D 1/185 |
| 2016/0368522 A1* | 12/2016 | Lubischer | B62D 1/105 |
| 2016/0375929 A1* | 12/2016 | Rouleau | B62D 1/181 74/493 |
| 2018/0154932 A1* | 6/2018 | Rakouth | B62D 1/183 |
| 2018/0257702 A1* | 9/2018 | Klesing | B60W 50/087 |
| 2019/0202494 A1* | 7/2019 | Itou | B60W 50/08 |

OTHER PUBLICATIONS

English translation of Office Action regarding related DE App. No. 10 209 122 432.2; dated Jul. 28, 2020.

* cited by examiner

*Primary Examiner* — James A English
(74) *Attorney, Agent, or Firm* — Dickinson Wright PLLC

(57) ABSTRACT

A retractable steering column assembly includes a retractable portion. The retractable steering column assembly also includes an electric actuator mechanism for moving the retractable portion throughout a plurality of regions, the plurality of regions comprising an unstowed region, a stowed region, and a transition region between the unstowed region and the stowed region. The retractable steering column assembly further includes a controller monitoring at least one positional property of the retractable portion during movement within the transition region to detect a potential driver intervention of the movement.

10 Claims, 4 Drawing Sheets

US 10,858,033 B2

DRIVER INTERVENTION DETECTION DURING STEERING COLUMN ASSEMBLY POWER STOWING AND UNSTOWING

BACKGROUND OF THE INVENTION

The embodiments described herein relate to retracting steering column assemblies and, more particularly, to driver intervention detection during steering column assembly power stowing and unstowing events.

As autonomously driven vehicles are developed, a number of opportunities will evolve related to comfort, entertainment and functionality for drivers. Steering wheels are commonly limited to standard driving positions due to the need for a driver to handle the steering wheel during operation of the vehicle. These limitations may be unnecessary during an autonomous driving mode of a vehicle. For example, a steering wheel may be retracted to a stowed position to enlarge the space available for a driver.

An automated, electromechanical system is often relied upon to translate the steering column between an extended position and a retracted position. Automated stowing and unstowing of a steering column may lead to physical damage to the vehicle during such powered events due to driver intervention.

SUMMARY OF THE INVENTION

According to an aspect of the disclosure, a method of detecting driver intervention during an automated transition movement of a steering column assembly is provided. The method includes determining whether a retractable portion of the steering column assembly is automatically transitioning from an unstowed position to a stowed position with an electric actuator mechanism. The method also includes monitoring a positional property of the retractable portion over time intervals to determine a movement of the retractable portion. The method further includes determining if the movement of the retractable portion is within predefined movement boundaries for a transition movement profile for the retractable portion. The method yet further includes stopping movement of the retractable portion if the determined movement is not within the predefined movement boundaries.

According to another aspect of the disclosure, a method of detecting driver intervention during an automated transition movement of a steering column assembly is provided. The method includes determining whether a retractable portion of the steering column assembly is automatically transitioning from a stowed position to an unstowed position with an electric actuator mechanism. The method also includes monitoring a positional property of the retractable portion over time intervals to determine a movement of the retractable portion. The method further includes determining if the movement of the retractable portion is within predefined movement boundaries for a transition movement profile for the retractable portion. The method yet further includes stopping movement of the retractable portion if the determined movement is not within the predefined movement boundaries.

According to yet another aspect of the disclosure, a retractable steering column assembly includes a retractable portion. The retractable steering column assembly also includes an electric actuator mechanism for moving the retractable portion throughout a plurality of regions, the plurality of regions comprising an unstowed region, a stowed region, and a transition region between the unstowed region and the stowed region. The retractable steering column assembly further includes a controller monitoring at least one positional property of the retractable portion during movement within the transition region to detect a potential driver intervention of the movement.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
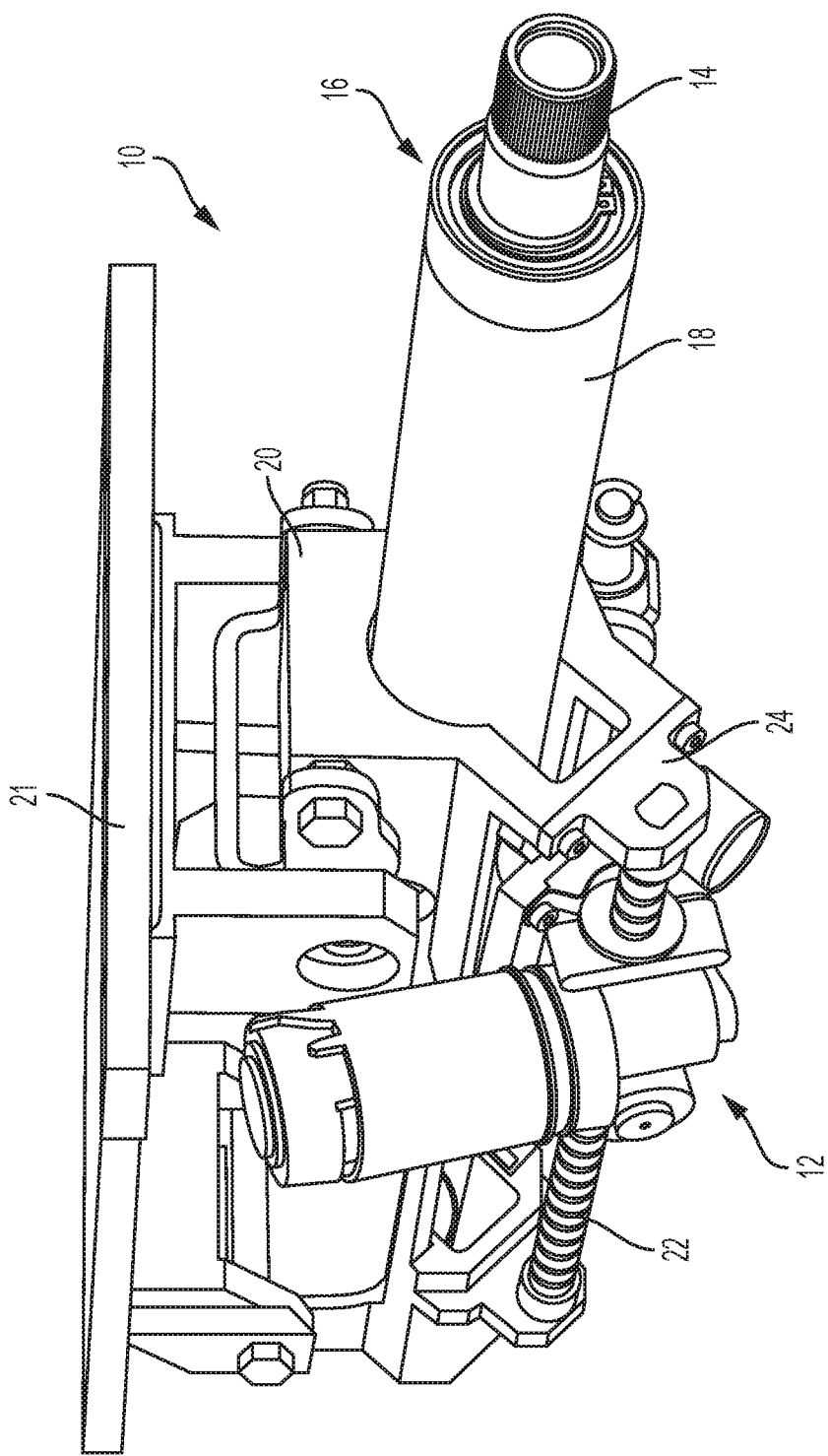
FIG. 1 is a perspective view of a steering column assembly.

Referring now to the Figures, where the invention will be described with reference to specific embodiments, without limiting same, FIG. 1 illustrates a steering column assembly 10. The steering column assembly 10 facilitates translation of a steering wheel (not shown) and a steering shaft 14 in a retractable manner. This is particularly beneficial in embodiments where the assembly 10 is employed in a passenger vehicle equipped with Advanced Driver Assist System(s) (ADAS) to allow the vehicle to be autonomously, or semi-autonomously, controlled using sensing, steering, and/or braking technology. When the ADAS is activated, the steering wheel is not required for vehicle control in some situations. Retraction of the steering wheel and steering shaft 14 toward, and possibly into, the instrument cluster greatly enhances user comfort by providing a driver with more space. The additional space provided facilitates additional workspace area or leg room, for example.

The embodiments described herein provide a retractable steering column which allows the steering wheel to be retracted while the vehicle is in an autonomous, or semi-autonomous, driving mode, and methods associated with monitoring and adjusting the steering column assembly 10. The operating conditions described herein for the steering wheel are standard driving mode, autonomous driving mode, and a transition mode therebetween.

In the standard driving mode, the steering column assembly 10 is extended to a location that disposes the steering wheel in a position that is comfortably reached by a driver in a manner that allows the driver to fully handle and control the steering wheel. The transition mode is defined by movement of the steering column assembly 10 during transitioning of the assembly between the standard and autonomous driving modes. An electric actuator mechanism 12 at least partially retracts the steering column assembly 10 into the instrument cluster of the vehicle during the transition mode. When the driver wants to transition back to the standard driving mode, the ADAS is deactivated and the electric actuator mechanism 12 extends the steering column assembly 10 to an extended position that allows the driver to easily handle the steering wheel.

Extension and retraction of the steering column assembly 10 refers to translation of a retractable portion 16 of the steering column assembly 10. The retractable portion 16 includes one or more components that are translatable. For example, in addition to the aforementioned steering wheel and the steering shaft 14, a moveable portion 18, which may also be referred to as an upper jacket in some embodiments, is translatable relative to a stationary portion 20, which may be referred to as a lower jacket in some embodiments. Also shown is a mounting bracket 21 that couples the steering column assembly 10 to the vehicle.

The electric actuator mechanism 12 is operatively coupled to the moveable portion 18 and the stationary portion 20 of the steering column assembly 10. A translating assembly facilitates automated telescoping (i.e., translating) and raking (i.e., tilting) of the steering column assembly. Many different types of translating assemblies are contemplated, but the following embodiment is described for purposes of example only, as the embodiment is not intended to be limiting. In particular, a threaded rod 22, such as a ball screw, is operatively coupled to the stationary portion 20 with one or more brackets 24. A nut, such as a ball nut, is in threaded engagement with the threaded rod 22 for translation along the threaded rod 22. The threaded rod 22 and nut may be referred to herein as a translating assembly. As described in detail below, a plurality of additional components of the electric actuator mechanism 12 are operatively coupled to the nut and also translate along the threaded rod 22. In operation, the electric actuator mechanism 12 translates the moveable portion 18 relative to the stationary portion 20 to extend and retract the steering column assembly 10 in an electrically powered manner.

Figure 2:
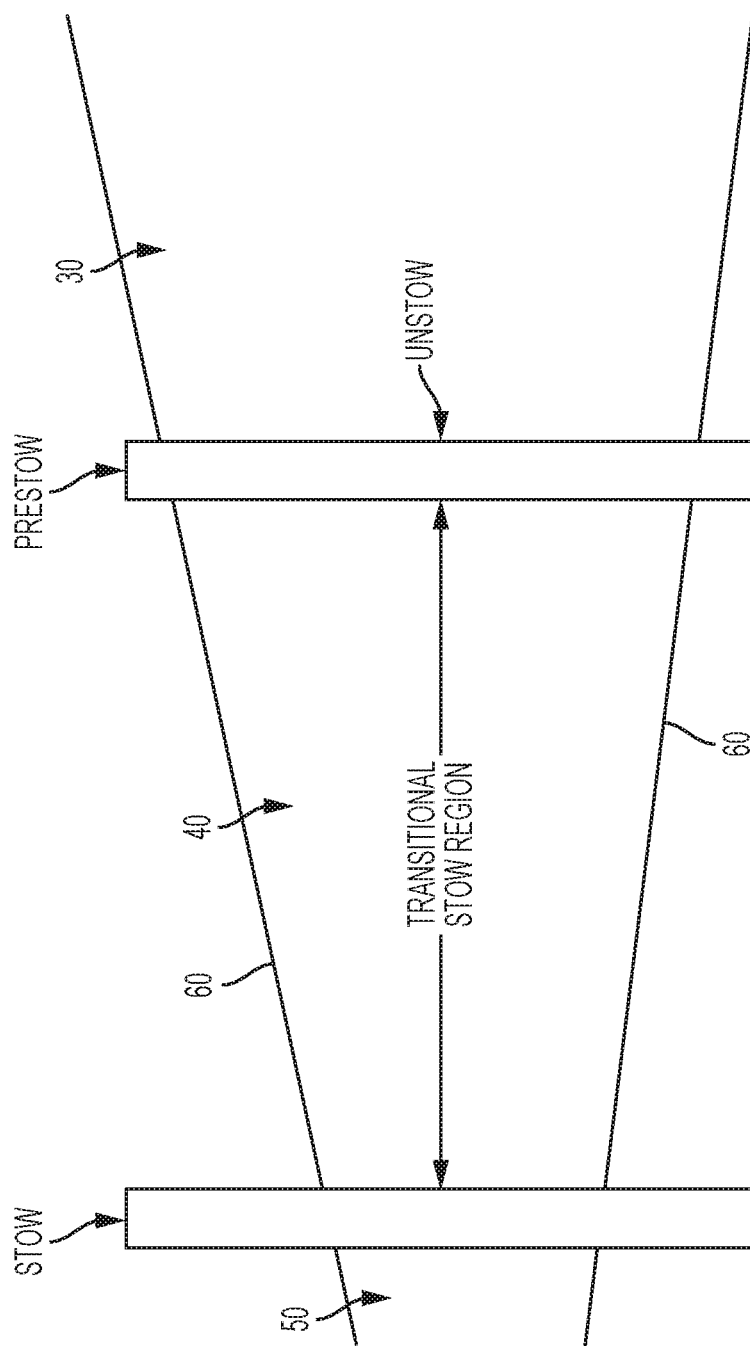
FIG. 2 is a diagram illustrating multiple regions associated with stowed and unstowed positions of the steering column assembly.

Referring now to FIG. 2, three discrete zones—or regions—associated with positioning of the steering column assembly 10 are illustrated. A first region may be referred to as an unstowed region and is generally referenced with numeral 30. The first region 30 defines boundaries of the telescope and rake positions where the driver may have full control of adjustability of the steering column assembly 10. In other words, the driver has full control of telescope and/or rake adjustment when the steering column assembly 10 is in the first region 30. Reference to the steering column assembly 10 being within the first region 30 refers to a specified portion or location of the steering column assembly 10 being within the first region 30. For example, the most rearward portion of the overall assembly, such as the steering input device (e.g., steering wheel) may be the reference point of the overall assembly that defines when the steering column assembly 10 is considered to be in the first region 30. However, alternative reference points of the steering column assembly 10 may be employed in some embodiments.

A second region may be referred to as a transitional region and is generally referenced with numeral 40. The second region 40 defines boundaries of the telescope and rake positions where the driver cannot manually move the steering column assembly 10 towards the instrument cluster (i.e., forward in vehicle). In other words, the driver has partial control of telescope and/or rake adjustment when the steering column assembly 10 is in the second region 40, since s/he may only adjust the steering column assembly 10 rearwardly away from the instrument cluster. Reference to the steering column assembly 10 being within the second region 40 refers to a specified portion or location of the steering column assembly 10 being within the second region 40. For example, the most rearward portion of the overall assembly, such as the steering input device (e.g., steering wheel) may be the reference point of the overall assembly that defines when the steering column assembly 10 is considered to be in the second region 40. However, as with the first region description, alternative reference points of the steering column assembly 10 may be employed in some embodiments.

A third region may be referred to as a stowed region and is generally referenced with numeral 50. The third region 50 defines boundaries of the telescope and rake positions where the driver cannot manually move the steering column assembly 10 in any direction. In other words, the driver has no control of telescope and/or rake adjustment when the steering column assembly 10 is in the third region 50. Reference to the steering column assembly 10 being within the third region 50 refers to a specified portion or location of the steering column assembly 10 being within the third region 50. For example, the most rearward portion of the overall assembly, such as the steering input device (e.g., steering wheel) may be the reference point of the overall assembly that defines when the steering column assembly 10 is considered to be in the third region 50. However, as with the first and second region descriptions, alternative reference points of the steering column assembly 10 may be employed in some embodiments.

As shown in FIG. 2, each region 30, 40, 50 defines a tapering of the rake position boundary of the steering column assembly 10. The rake position boundary is referenced with numeral 60. Positioning and travel along the telescope path during stowing or unstowing of the steering column assembly 10, driver restriction can be applied for safe operation and transition. The above-described restrictions, system response and/or region boundaries are configurable based on the particular application of use, thereby providing design flexibility.

Figure 3:
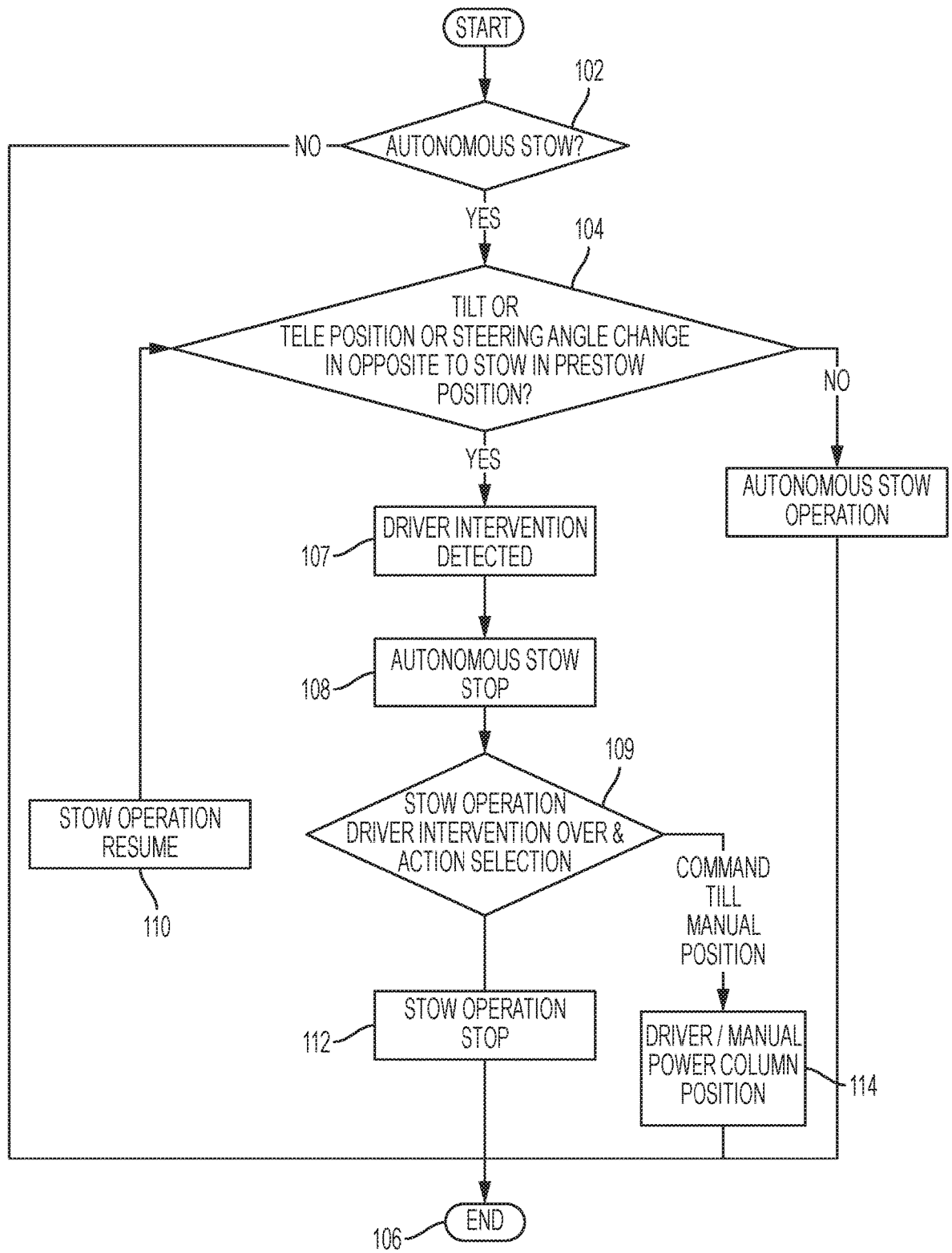
FIG. 3 is a flow diagram illustrating a method of monitoring the steering column assembly during an automated stowing event.

Referring to FIG. 3, illustrated is a sequence of operating conditions of the steering column assembly 10, showing a method of monitoring and/or operating the steering column assembly 10 during an automated stowing operation. The method provides protection against physical damage to the vehicle during the powered stowing of the steering column assembly 10 which may occur due to driver intervention. Such intervention includes moving, or attempting to move, the steering column assembly 10 while the steering column assembly in the in second region 40. The actions described herein may be carried out, in part or entirely, with the ADAS equipment described above. As one can appreciate, this includes, but is not limited, to processing equipment, detection equipment (e.g., sensors), and controlling equipment, for example.

Block 102 represents detection of whether the steering column assembly is undergoing automated (e.g., powered stow event during a transition to an autonomous driving mode) stowing movement. If the steering column assembly is not undergoing automated stowing movement, the monitoring temporarily ends and may be looped, as needed. If automated stowing movement is detected, at block 104 it is determined if a positional change has been made, or if a positional change is attempting to be made, that counters the stowing movement of the steering column assembly. Examples of positional changes that are monitored include tilting or telescoping of the steering column assembly, as well as steering angle changes of the steering column assembly. If no stowing opposing positional change(s) is detected, the stowing operation continues until completion toward the stowed position at block 106.

If a stowing opposing position change (or changes) is detected at block 107, the automated stowing movement is stopped at block 108. This may be determined in any suitable manner, such as monitoring a positional property of the retractable portion over specified time intervals to determine a movement of the retractable portion using a position vs. time algorithm. For example, in some embodiments the position of the retractable portion will be changing at a constant rate during transitioning, where driver intervention should not be active. In such embodiments, driver intervention is detected when the rate of change of position (faster or slower) is greater than a threshold value. Additionally, movement in a direction that opposes the commanded automated movement direction—even if at the commanded speed/rate—driver intervention is detected. This allows the system to determine if the movement of the retractable portion of the steering column assembly is within predefined movement boundaries for a transition movement profile for the retractable portion. In this scenario, if the driver has taken control of the automated stow operation by changing the direction of stow operation or with a steering wheel angle change, this would indicate that a driver intervention has occurred, and stow operation would stop, as discussed above. When the driver intervention event stops, one or more available selection options are available depending upon the position of the steering column assembly at block 109. In the illustrated embodiment, if the steering column assembly is positioned within an acceptable boundary (or boundaries) the automated stowing operation may resume, as shown in block 110. However, if not within such acceptable boundaries, or if the driver chooses, the automated stowing operation may be stopped at block 112. The ADAS system continues to command the steering column assembly until the steering column assembly is to the unstowed position that allows manual driving, as shown at block 114.

Figure 4:
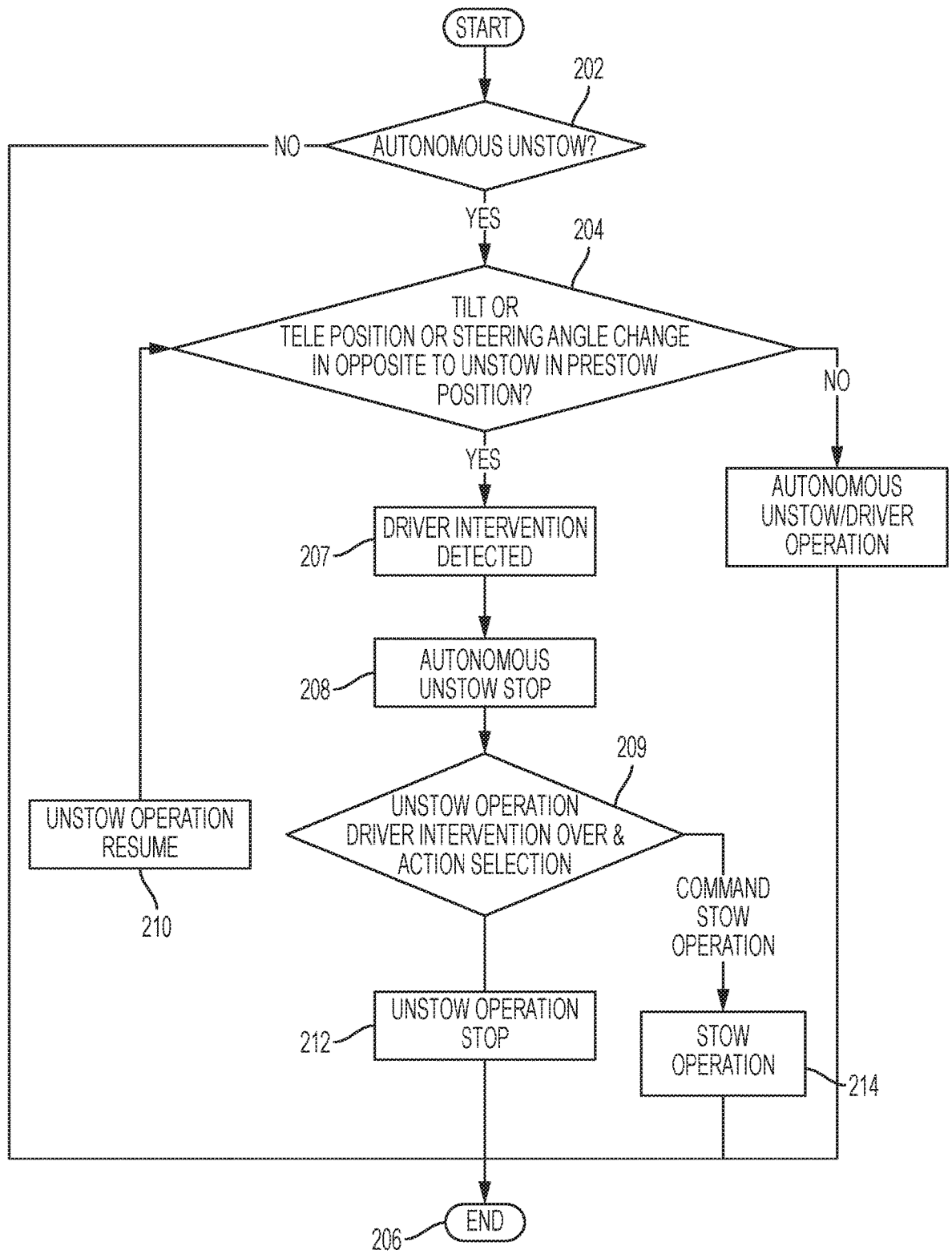
FIG. 4 is a flow diagram illustrating a method of monitoring the steering column assembly during an automated unstowing event.

Referring now to FIG. 4, illustrated is a sequence of operating conditions of the steering column assembly 10, showing a method of monitoring and/or operating the steering column assembly 10 during an automated unstowing operation. The method provides protection against physical damage to the vehicle during the powered stowing of the steering column assembly 10 which may occur due to driver intervention. Such intervention includes moving, or attempting to move, the steering column assembly 10 while the steering column assembly in the in second region 40. The actions described herein may be carried out, in part or entirely, with the ADAS equipment described above. As one can appreciate, this includes, but is not limited, to processing equipment, detection equipment (e.g., sensors), and controlling equipment, for example.

Block 202 represents detection of whether the steering column assembly is undergoing automated (e.g., powered unstow event during a transition to an autonomous driving mode) unstowing movement. If the steering column assembly is not undergoing automated unstowing movement, the monitoring temporarily ends and may be looped, as needed. If automated unstowing movement is detected, at block 204 it is determined if a positional change has been made, or if a positional change is attempting to be made, that counters the unstowing movement of the steering column assembly. Examples of positional changes that are monitored include tilting or telescoping of the steering column assembly, as well as steering angle changes of the steering column assembly. If no unstowing opposing positional change(s) is detected, the unstowing operation continues until completion toward the unstowed position at block 206.

If an unstowing opposing position change (or changes) is detected at block 207, the automated unstowing movement is stopped at block 208. This may be determined in any suitable manner, such as monitoring a positional property of the retractable portion over specified time intervals to determine a movement of the retractable portion using a position vs. time algorithm. For example, in some embodiments the position of the retractable portion will be changing at a constant rate during transitioning, where driver intervention should not be active. In such embodiments, driver intervention is detected when the rate of change of position (faster or slower) is greater than a threshold value. Additionally, movement in a direction that opposes the commanded automated movement direction—even if at the commanded speed/rate—driver intervention is detected. This allows the system to determine if the movement of the retractable portion of the steering column assembly is within predefined movement boundaries for a transition movement profile for the retractable portion. In this scenario, if the driver has taken control of the automated unstow operation by changing the direction of unstow operation or with a steering wheel angle change, this would indicate that a driver intervention has occurred, and unstow operation would stop, as discussed above. When the driver intervention event stops, one or more available selection options are available depending upon the position of the steering column assembly at block 209. In the illustrated embodiment, if the steering column assembly is positioned within an acceptable boundary (or boundaries) the automated unstowing operation may resume, as shown in block 210. However, if not within such acceptable boundaries, or if the driver chooses, the automated unstowing operation may be stopped at block 212. The ADAS system continues to command the steering column assembly until the steering column assembly is returned to the stowed position, as shown at block 214.

The embodiments described herein facilitates safe, reliable and automatic stowing and unstowing of the steering column assembly 10.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A method of detecting driver intervention during an automated transition movement of a steering column assembly comprising:

determining whether a retractable portion of the steering column assembly is automatically transitioning from an unstowed position to a stowed position with an electric actuator mechanism;

monitoring a positional property of the retractable portion over time intervals to determine a movement of the retractable portion;

determining if the movement of the retractable portion is within predefined movement boundaries for a transition movement profile for the retractable portion, wherein determining that the retractable portion is not within the predefined movement boundaries is made when the rate of change of the positional property of the retractable portion is greater than a threshold value;

stopping movement of the retractable portion if the determined movement is not within the predefined movement boundaries; and selecting from a plurality of actions after movement of the retractable portion has been stopped, the plurality of actions comprising resuming automated movement toward the stowed position, maintaining the retractable portion in a fixed position, and allowing movement to the unstowed position.

2. The method of claim 1, wherein the positional property is a telescope position of the retractable portion.

3. The method of claim 1, wherein the positional property is a tilt position of the retractable portion.

4. The method of claim 1, wherein the positional property is a steering angle of the retractable portion.

5. The method of claim 1, wherein the positional property is one of a plurality of a positional properties, the plurality of positional properties comprising a telescope position, a tilt position, and a steering angle.

6. A method of detecting driver intervention during an automated transition movement of a steering column assembly comprising:

determining whether a retractable portion of the steering column assembly is automatically transitioning from a stowed position to an unstowed position with an electric actuator mechanism;

monitoring a positional property of the retractable portion over time intervals to determine a movement of the retractable portion;

determining if the movement of the retractable portion is within predefined movement boundaries for a transition movement profile for the retractable portion, wherein determining that the retractable portion is not within the predefined movement boundaries is made when the rate of change of the positional property of the retractable portion is greater than a threshold value;

stopping movement of the retractable portion if the determined movement is not within the predefined movement boundaries; and selecting from a plurality of actions after movement of the retractable portion has been stopped, the plurality of actions comprising resuming automated movement toward the unstowed position, maintaining the retractable portion in a fixed position, and allowing movement to the stowed position.

7. The method of claim 6, wherein the positional property is a telescope position of the retractable portion.

8. The method of claim 6, wherein the positional property is a tilt position of the retractable portion.

9. The method of claim 6, wherein the positional property is a steering angle of the retractable portion.

10. The method of claim 6, wherein the positional property is one of a plurality of a positional properties, the plurality of positional properties comprising a telescope position, a tilt position, and a steering angle.

* * * * *